United States Patent [19]
Rotz et al.

[11] Patent Number: 6,155,652
[45] Date of Patent: Dec. 5, 2000

[54] CAM ACTIVATED HYDRAULIC BRAKING SYSTEM

[75] Inventors: Timothy James Rotz, Hummelstown; Thomas E. Hubicz, Dallastown; William A. Fay, III, East Berlin; Dan A. Tamburrino; Dana R. Edwards, both of York; William J. Brown, Hanover, all of Pa.

[73] Assignee: United Defense, L.P., Arlington, Va.

[21] Appl. No.: 09/267,915

[22] Filed: Mar. 4, 1999

[51] Int. Cl.[7] ........................................ B60T 13/74
[52] U.S. Cl. ........................ 303/2; 74/572; 74/107
[58] Field of Search ........................ 303/2, 10; 74/512, 74/107; 192/70.24, 70.2

[56] References Cited

U.S. PATENT DOCUMENTS

| | | | |
|---|---|---|---|
| 2,854,858 | 10/1958 | Butterfield et al. | 303/2 |
| 3,278,239 | 10/1966 | Klaus et al. | 303/10 |
| 3,438,271 | 4/1969 | Cain | 74/107 |
| 3,441,319 | 4/1969 | Boueil et al. | 74/512 |
| 3,469,660 | 9/1969 | Mathers | 303/2 |
| 3,854,559 | 12/1974 | Talak et al. | 303/2 |
| 5,307,906 | 5/1994 | Jamzadeh et al. | 188/106 F |
| 5,322,147 | 6/1994 | Clemens | 188/264 D |
| 5,362,138 | 11/1994 | Clemens et al. | 303/50 |
| 5,390,986 | 2/1995 | Hall, III | 303/3 |

*Primary Examiner*—Douglas C. Butler
*Assistant Examiner*—Devon Kramer
*Attorney, Agent, or Firm*—R. C. Kamp

[57] ABSTRACT

A braking system controlled by an operator's pedal for a vehicle equipped with a mechanically actuated brake clutch pack in which a cam is rotated in response to movement of a brake pedal to operate a pressure-modulating hydraulic valve to direct fluid pressure to an hydraulic actuator extendable under pressure to engage a force transfer member secured to an actuator rod, which rod is connected to apply the clutch pack when tensioned.

9 Claims, 2 Drawing Sheets

CAM ACTIVATED HYDRAULIC BRAKING SYSTEM

This invention relates to hydraulic braking systems generally, and more particularly, to such systems that are especially suitable for heavy vehicles.

BACKGROUND OF THE INVENTION

Prior braking systems for heavy vehicles utilized a mechanical braking that would initiate slowing of the vehicle with a hydraulic braking system subsequently being activated to bring the vehicle to a complete stop. Activation of the hydraulic braking system tended to reverse the forces in the linkage connected to the brake pedal, changing the compression encountered during the initial mechanical braking to a tension or pulling force at the onset of the hydraulic braking system. As a consequence, the sensation encountered by the operator was that the brake pedal was finishing its rotation or stroke without any additional effort by the operator. As a result, the operator was deprived of the desired "feel" of the braking operation, and the braking effort tended to be difficult to control, often producing stops that were abrupt, i.e. not smooth.

BRIEF SUMMARY OF THE INVENTION

The present invention provides a hydraulic braking system that is activated by a cam, rotated by input from the operator-controlled pedal, engaging the spool of a modulating valve arranged to port hydraulic pressure to the braking disk pack. The cam is provided with a profile so that the hydraulic pressure exerted on the brake disk pack is directly related to the position of the pedal. The pressure directed to the disk pack gradually and uniformly increases as the pedal is depressed to exert a corresponding braking effort to bring the vehicle to a smooth and complete stop. This invention thus provides a cam activated hydraulic braking system that overcomes the aforementioned shortcomings of the prior art, that is arranged to bring the vehicle on which it is installed to a complete stop even with complete loss of hydraulic power, that may be readily retrofitted on existing vehicles, and that is relatively easy and economical to fabricate, install and maintain. These and many other attributes and the attendant advantages thereof will become more readily apparent from perusal of the following description of a preferred embodiment of the invention and the accompanying drawings.

DETAILED DESCRIPTION OF A PREFERED EMBODIMENT

Figure 1:
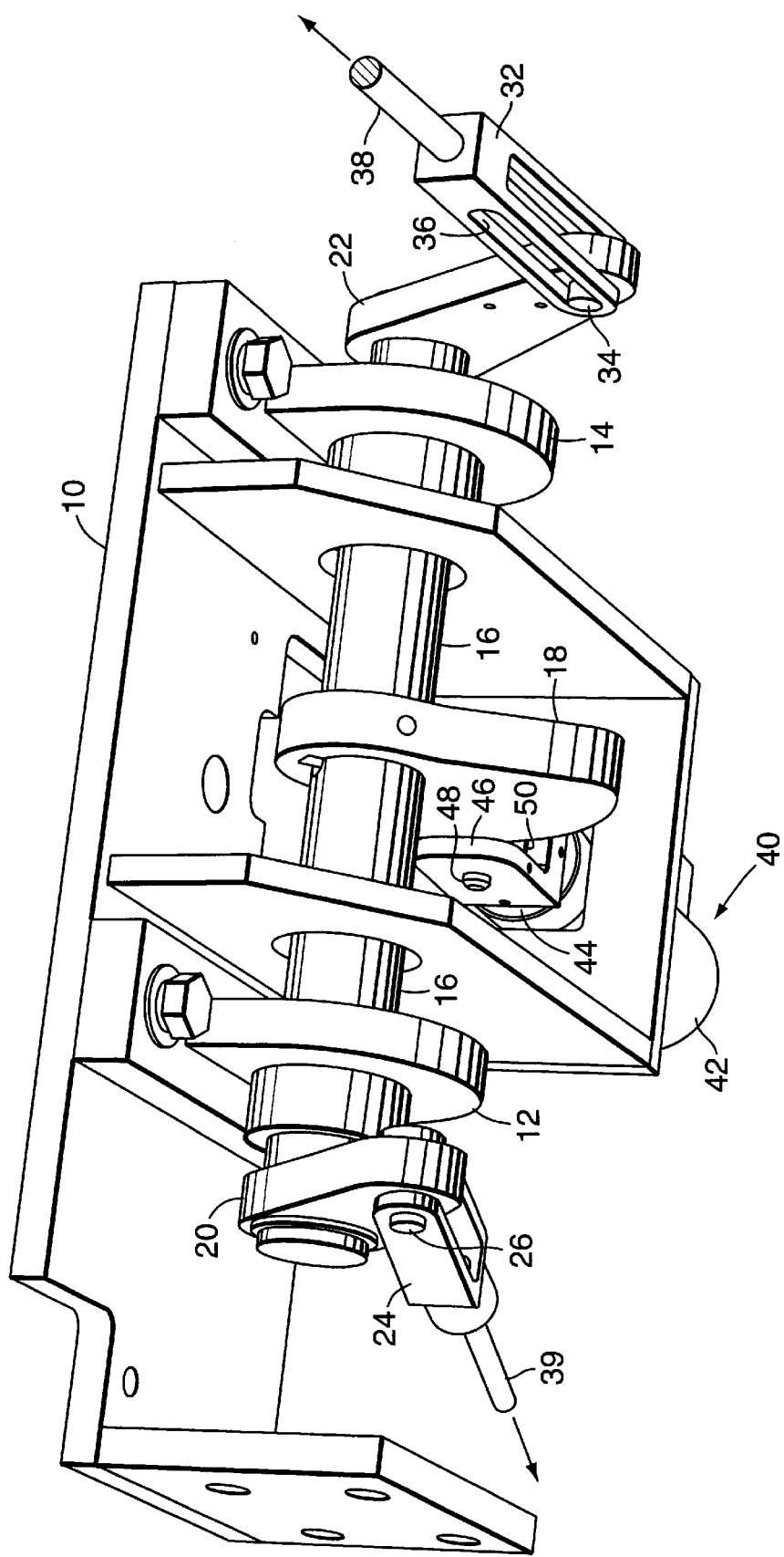
FIG. 1 is a pictorial view of the cam, the hydraulic valve it activates and the associated mechanism constructed and arranged according to the present invention.

Referring to FIG. 1, there is shown a base plate 10 which is secured to the underside of an existing portion of the vehicle's frame to the rear of and near the brake pedal (not shown) actuated by the vehicle's operator or driver. A pair of bearing blocks 12 and 14 is secured to the base plate 10 and rotatably supports a shaft 16 to which a cam 18 is secured by a key so that the cam rotates with the shaft. Arms 20 and 22 are affixed to each end of the shaft 16. A clevis 24 is pivotally connected to the free end of the arm 20 by a pin 26. A rod 39 is attached at one end to the clevis 24 and at its other end to the linkage associated with the brake pedal, and is arranged to exert a tension force on the clevis 24, i.e., in the direction of the arrow, when the brake pedal is depressed. The pinned connection of the clevis 24 to the arm 20 permits the brake pedal to immediately reposition itself in response to a reduction of operator input. A clevis 32 is connected to the arm 22 by a pin 34 extending through the arm and protruding into slots 36 formed in opposite sides of the clevis. A rod 38 is secured to the clevis 32 and is arranged, as will be more fully explained hereinafter, to provide braking should hydraulic pressure be lost.

A modulating valve, indicated generally at 40, is secured to a bracket affixed to the base plate 10 and has valve body 42 with a spool 44 reciprocal therein and biased outward of the body. A clevis 46 is secured to the free end of the spool 44. A pin 48 extends between the sides of the clevis 46 and rotatably mounts a roller 50, which is maintained in contact with the cam 18 by the outward bias exerted on the valve spool 44. The roller 50 thus acts as a cam follower.

Figure 2:
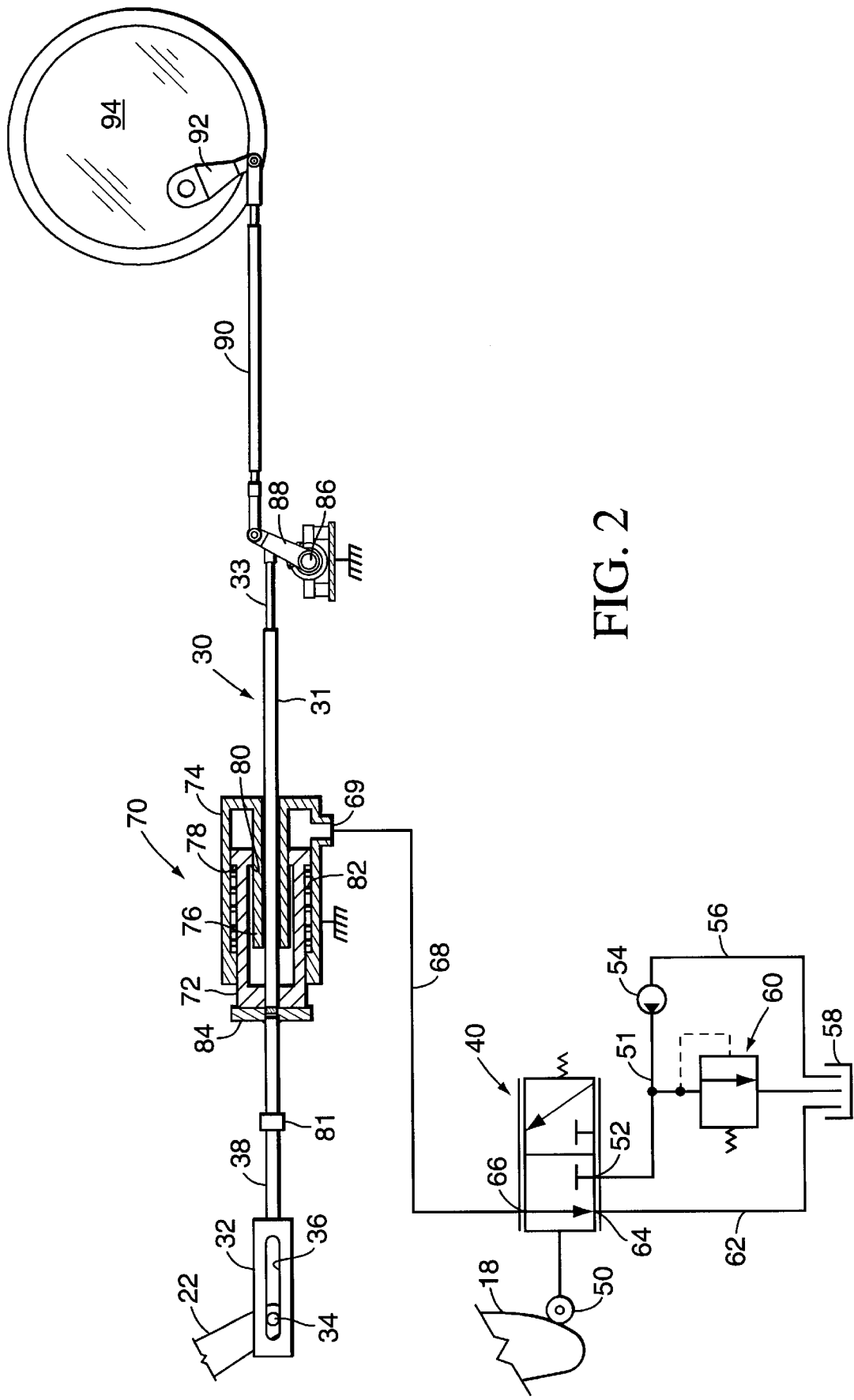
FIG. 2 is an overall schematic of the cam activated hydraulic braking system according to the present invention.

As shown in FIG. 2, hydraulic fluid under pressure is supplied through conduit 51 to the inlet port 52 of the modulating valve 40 by a hydraulic pump 54, which draws fluid through conduit 56 from a reservoir 58. The pump 54 may be driven by any power source, but is preferably driven by an electric motor so that hydraulic pressure is available for braking, at least temporarily, in the event of engine failure; the electric motor being energized by the vehicle's batteries. It may also be desirable to tee an accumulator off of the conduit 51 for the same purpose in the event the pump 54 or its power source should fail. In conventional manner, a pressure relief valve 60 is connected between the conduit 51 and the reservoir 58. A return conduit 62 connects the return port 64 on the valve 40 to the reservoir 58. The port 66 on the valve 40 is connected by conduit 68 to the port 69 of a hydraulic actuator, indicated generally at 70. The actuator 70 has a piston 72 that is reciprocal within a cylinder 74. The face of outer end of the piston 72, i.e., the end commonly referred to as the rod end, is provided with a hole through which the rod 38 extends. A hollow tubular extension 76 is provided on the end of the cylinder 74 opposite the cylinder 72, i.e., the end commonly to as the head end, and extends inward thereof. The inner end of the cylinder 72 has an outward projecting flange sealingly engageable with the inside surface of the outer wall of the cylinder 74 and an inward projecting flange sealingly engageable with the outer surface of the hollow tubular extension 76. A compression spring 82 is interposed between the flange 78 of the piston 72 and the rod end of the cylinder 74 and urges the actuator 70 toward a collapsed position. The actuator 70 thus comprises a hollow piston and cylinder through which a cable assembly 30 extends. The cable assembly 30 includes an outer sheath 31 and an inner cable 33, which cable is secured to a heavy disk 84 normally engaging the outer face of the piston 72 to function as a force transfer member when the cable 33 is tensioned. The rod 38 is also secured to the disk 84, with a joint, such as spherical universal joint 81, interposed in the rod 38 to provide compensation for small misalignments between the axis of the rod 38 and the hollow piston and cylinder.

The end of the inner cable 33 opposite its connection with the disk 84 is pinned to a lever affixed to a cross shaft 86 intermediate its ends, which cross shaft extends substantially across the width of the vehicle and is journaled on the vehicle's frame at each end. A transfer lever is affixed to each end of the cross shaft, one such lever being shown at 88. Actuating rods, one of which is shown at 90, are pinned between each of the transfer levers and the actuating lever of a brake clutch pack in the final drives of the vehicle. One of the actuating levers is shown at 92 for actuation of its associated clutch pack 94. Each of the brake clutch packs is conventional, and essentially comprises three plates, the middle one grounded and two outer ones mounted on the final drive shaft, that are mechanically squeezed together to slow or stop rotation of the final drive shaft as the actuator lever 92 is rotated by the actuating rod 90. The actuating levers, such as 92, are normally biased to a position in which the plates of the clutch packs are disengaged When no braking is being applied, the cam 18 permits the valve spool 44 to take the position shown in Fig.2, with the inlet port 52 being completely blocked and port 66 connected with return port 64. In this condition, the cylinder port 69 is in fall communication with the reservoir 58 permitting the compression spring 82 to fully retract the piston 72. Thus, there is no force on or displacement of the disk 84 and the actuator lever 92 may be moved by its own internal bias to a fully released position, i.e. no braking. Any depression of the brake pedal by the operator will apply a tension force to the rod 39 causing the lever 20 and shaft 16 connected thereto to rotate. The cam 18 will also rotate displacing the spool 44 of the valve 40 and connecting the supply port 52 to the port 66. The cam has a profile that initiates movement of the valve spool just below the breaking point of the modulating valve and has an initial rapid rise, which permits the supplying of sufficient pressure almost immediately to overcome the friction in the system. The profile or rise is thereafter smooth and gradual until full depression of the spool 44 in the valve 40 is reached. The profile of the cam 18 then remains constant to avoid any possibility of damaging the valve. As the pedal is depressed, hydraulic fluid from the pump 54 will be directed to the actuator 70 causing the piston 72 to extend. Extension of the piston 72 causes the disk 84 and the cable 33 to which it is attached to move to the left as viewed in Fig.2. Movement of the cable 33 will result in each of the actuator levers 92 being rotated to exert a braking action. Because the valve 40 is a modulating valve, the level of braking will always be related to the position of the pedal because the amount of pressure will be related to the position of the cam 18. Thus, a driver can depress the pedal to any point in its travel, hold the pedal at that position, and attain a corresponding level of braking. The driver can then move the pedal to another position and the level of braking will change accordingly.

Normally, i.e., when hydraulic pressure is available, the application of the brakes is caused by the piston 72 engaging the disk 84 affixed to the cable 33. Under such conditions, the arm 22, which rotates with the shaft 16, the clevis 32 and the pin 34 simply follows the movement caused by the piston 72, moving within the slot 36 of the clevis 32. However, upon loss of hydraulic pressure, the piston 72 will remain retracted, and rotation of the arm 22 will cause the pin 34 to contact the bottom of the slot 36. The movement of the rod 38 necessary to apply the brakes will then result from continued rotation of the arm 22. As this occurs, the disk 84 will move away from the face of the piston 72, since the disk is affixed to the rod 38 and there is no direct connection between the rod 38 and the piston 72. Thus, the driver has the ability to bring the vehicle to a complete stop even with no hydraulic pressure available.

As used herein, heavy vehicle is intended to mean those weighing twenty tons or more, such as the HERCULES heavy recovery vehicle.

While a preferred embodiment of the present invention has been disclosed herein, various modifications and changes may be made thereto without departing from the spirit of the invention as defined by the scope of the appended claims.

What is claimed is:

1. A braking system controlled by an operator's pedal for a vehicle having a mechanically actuated brake clutch pack arranged for braking the vehicle comprising:
   a pressure-modulating hydraulic valve;
   hydraulic pump for supplying hydraulic fluid under pressure to said valve;
   a cam for operating said valve;
   a rotatable shaft secured to said cam for rotation therewith;
   a first arm attached to said shaft;
   a first clevis pinned to said first arm;
   an operating rod attached to said clevis and connected to said pedal for rotating said shaft in response to movement of said pedal;
   a hydraulic actuator being extendable under pressure and connected to receive pressure from said valve;
   an actuating rod connected, when tensioned, to apply said clutch pack; and
   a force transfer member attached to said rod and engageable by said actuator for tensioning said rod as said actuator is extended, whereby the braking effort is related to the position of said pedal.

2. The invention according to claim 1, wherein said hydraulic actuator comprises:
   a cylinder having a tubular extension; and
   a piston with an outer end having a hole extending therethrough reciprocal in said cylinder;
   said actuating rod extending through said tubular extension and said hole.

3. The invention according to claim 2, and further comprising:
   a second arm attached to the shaft for rotation therewith; and
   a second clevis pinned to said second arm and attached to said actuating rod;
   whereby said actuating rod is tensioned, in the absence of hydraulic pressure, by rotation of said shaft.

4. The invention according to claim 3, and further comprising:
   a joint interposed in said actuating rod between the cylinder and said second clevis.

5. A braking system for a vehicle having a pair of tracks, each of which is driven by a final drive with a brake clutch pack mechanically actuated by an actuating lever to brake the vehicle, said vehicle having a driver operated pedal for application thereof, said system comprising:
   a base plate attached to said vehicle;
   a shaft journaled on and supported by said base plate;
   a cam affixed to said shaft;
   a valve supported from said base plate and having a displaceable spool;
   a cam follower carried by said spool and engaging said cam;
   a first arm affixed to shaft and connected to said pedal for rotation of said shaft in response to movement of said pedal;
   a hydraulic actuator being extendable and connected to receive hydraulic fluid under pressure from said valve;
   a force transmitting member engageable with said actuator;

an actuating rod attached to said member and connected to said actuating levers to apply said brakes in response to depression of said pedal.

6. The invention according to claim 5, wherein said valve is a pressure-modulating valve.

7. The invention according to claim 6, wherein said actuator comprises:
   a cylinder connected to receive hydraulic fluid from said valve and having a tubular extension; and
   a piston having an outer end with a hole therethrough reciprocal within said cylinder and extendable under hydraulic pressure;
   said member being engageable with said outer end and said actuating rod extending through said hole and said tubular extension.

8. The invention according to claim 7, and further comprising:
   a second arm affixed to said shaft; and
   a second clevis pinned to said second arm and connected to said actuating rod;
   whereby rotation of said shaft will, in the absence of hydraulic pressure, permit said second arm to tension said arm as said shaft is rotated by said pedal to apply the brakes.

9. The invention according to claim 8, and further comprising a joint interposed in said actuating rod between said second clevis and said piston to permit said actuating rod to move freely within said hole and said tubular extension.

* * * * *